US011358720B2

(12) United States Patent
Felder et al.

(10) Patent No.: US 11,358,720 B2
(45) Date of Patent: Jun. 14, 2022

(54) HYBRID UNMANNED AERIAL VEHICLE SYSTEMS WITH QUICK RELEASE TETHER ASSEMBLY

(71) Applicant: Easy Aerial Inc., Brooklyn, NY (US)

(72) Inventors: Jason Felder, Highland Park, NJ (US); Omri Dayan, Brooklyn, NY (US); Ido Gur, New York, NY (US)

(73) Assignee: EASY AERIAL INC., Brooklyn, NY (US)

( * ) Notice: Subject to any disclaimer, the term of this patent is extended or adjusted under 35 U.S.C. 154(b) by 0 days.

(21) Appl. No.: 17/579,916

(22) Filed: Jan. 20, 2022

(65) Prior Publication Data

US 2022/0135223 A1    May 5, 2022

Related U.S. Application Data

(62) Division of application No. 17/392,501, filed on Aug. 3, 2021, which is a division of application No. 17/143,070, filed on Jan. 6, 2021, now Pat. No. 11,220,335.

(60) Provisional application No. 63/060,379, filed on Aug. 3, 2020.

(51) Int. Cl.
*B64D 1/02* (2006.01)
*B64C 39/02* (2006.01)

(52) U.S. Cl.
CPC .............. *B64D 1/02* (2013.01); *B64C 39/022* (2013.01); *B64C 39/024* (2013.01); *B64C 2201/027* (2013.01); *B64C 2201/066* (2013.01); *B64C 2201/126* (2013.01); *B64C 2201/148* (2013.01)

(58) Field of Classification Search
CPC .... B64D 1/02; B64C 39/022; B64C 2201/148
USPC .................................................. 244/158.2, 33
See application file for complete search history.

(56) References Cited

U.S. PATENT DOCUMENTS

| 3,149,803 | A | * | 9/1964 | Petrides | ................ B64C 39/022 244/17.23 |
| 4,601,444 | A | * | 7/1986 | Lindenbaum | ............. B64B 1/24 244/26 |
| 7,264,204 | B1 | * | 9/2007 | Portmann | ............. B64C 39/024 244/110 F |
| 9,505,494 | B1 | | 11/2016 | Marlow et al. | |
| 9,508,263 | B1 | | 11/2016 | Teng et al. | |
| 9,611,038 | B2 | | 4/2017 | Dahlstrom | |
| 9,618,940 | B1 | | 4/2017 | Michini et al. | |
| 9,811,083 | B2 | | 11/2017 | Stamatovski et al. | |
| 10,035,597 | B2 | * | 7/2018 | Desrochers | ............. B64D 1/12 |
| 10,078,808 | B1 | * | 9/2018 | Sibon | ................... G05D 1/0676 |
| 10,384,777 | B1 | * | 8/2019 | Welsh | ....................... B64F 3/02 |

(Continued)

FOREIGN PATENT DOCUMENTS

| CN | 106712160 A | 5/2017 |
| WO | 2017065411 A1 | 4/2017 |

*Primary Examiner* — Christopher P Ellis
(74) *Attorney, Agent, or Firm* — Carter, DeLuca & Farrell LLP; George Likourezos; Jason Scher

(57) ABSTRACT

An unmanned aerial vehicle system includes a tether assembly, an unmanned aerial vehicle, a processor, and a memory. The unmanned aerial vehicle comprising a housing and a slider plate supported by the housing. The memory containing instructions thereon, which, when executed by the processor, cause the unmanned aerial vehicle to move the slider plate relative to the housing to selectively decouple the tether assembly from the housing.

20 Claims, 13 Drawing Sheets

(56) References Cited

U.S. PATENT DOCUMENTS

| | | | |
|---|---|---|---|
| 10,514,024 B1* | 12/2019 | Shoemaker, Jr. | B64C 39/024 |
| 10,669,023 B2* | 6/2020 | Heinen | B64C 39/024 |
| 10,761,525 B2 | 9/2020 | Bethke et al. | |
| 2014/0091176 A1* | 4/2014 | McGeer | B64F 1/12 |
| | | | 244/110 F |
| 2015/0212391 A1* | 7/2015 | Waibel | G05D 1/0094 |
| | | | 701/2 |
| 2016/0200437 A1* | 7/2016 | Ryan | B64C 39/022 |
| | | | 244/99.2 |
| 2016/0340006 A1* | 11/2016 | Tang | B64C 39/024 |
| 2017/0029105 A1* | 2/2017 | Ferren | B64F 3/02 |
| 2017/0036777 A1* | 2/2017 | Martin | B64C 39/022 |
| 2017/0229022 A1 | 8/2017 | Gurel et al. | |
| 2017/0328814 A1* | 11/2017 | Castendyk | G01N 1/12 |
| 2017/0355460 A1* | 12/2017 | Shannon | B66C 1/38 |
| 2018/0105271 A1* | 4/2018 | Wypyszynski | B64D 1/02 |
| 2018/0118374 A1* | 5/2018 | Lombardini | B64C 39/024 |
| 2018/0312276 A1* | 11/2018 | Miller | B64C 31/06 |
| 2018/0327113 A1* | 11/2018 | von Flotow | F15B 1/26 |
| 2019/0355263 A1* | 11/2019 | Priest | G08G 5/0013 |
| 2020/0033157 A1* | 1/2020 | Kaufman | B64C 27/08 |
| 2020/0055613 A1* | 2/2020 | Miller | H04N 7/185 |
| 2020/0108922 A1* | 4/2020 | Smith | B64C 39/024 |
| 2020/0115052 A1* | 4/2020 | Fenny | B64C 39/022 |
| 2020/0115053 A1* | 4/2020 | Drennan | B64D 3/00 |
| 2020/0115054 A1* | 4/2020 | Ryan | B64D 5/00 |
| 2020/0164979 A1* | 5/2020 | Sokolowski | B64D 17/30 |
| 2020/0225684 A1* | 7/2020 | Anderson | B64C 39/022 |
| 2020/0314627 A1* | 10/2020 | Fischer | H04B 7/18506 |
| 2020/0369408 A1* | 11/2020 | Dolata | B64D 47/08 |
| 2020/0377210 A1* | 12/2020 | McRoberts | B64F 3/02 |
| 2020/0385115 A1* | 12/2020 | Piasecki | H04B 10/2575 |
| 2021/0011492 A1* | 1/2021 | Raabe | G05D 1/101 |
| 2021/0053676 A1* | 2/2021 | Brand | B64C 29/0033 |
| 2021/0129982 A1* | 5/2021 | Collins | B64F 3/02 |
| 2022/0024577 A1 | 1/2022 | Stamatovski | |

* cited by examiner

HYBRID UNMANNED AERIAL VEHICLE SYSTEMS WITH QUICK RELEASE TETHER ASSEMBLY

CROSS REFERENCE TO RELATED APPLICATIONS

This application is a divisional application of U.S. patent application Ser. No. 17/392,501, filed Aug. 3, 2021, which is a divisional application of U.S. patent application Ser. No. 17/143,070, filed Jan. 6, 2021, now U.S. Pat. No. 11,220,335, which claims the benefit of U.S. Provisional Application Ser. No. 63/060,379, filed Aug. 3, 2020, the entire contents of each of which are incorporated by reference herein.

TECHNICAL FIELD

This disclosure relates to aircraft, and more particularly, to hybrid unmanned aerial vehicle (UAV) systems and methods for quickly releasing a tether assembly from a UAV to enable the UAV to fly freely.

BACKGROUND

Tether-assembly "drone-in-a-box" systems offer uninterrupted flight time, as the drone is powered via a tether assembly to a base system. However, the drone can only generally move laterally if the base system is mounted on a mobile platform, a significant limitation on the use of a UAV. If the system is deployed in a surveillance situation, and it needs to monitor a moving target (e.g., security breach), it requires the use of another device/system to track or intercept the target. On the other hand, standard "drone-in-a-box" systems range freely from their base stations and can follow moving targets, yet their flight time, or, put another way, the time during which they can continuously surveil an area, is limited by their need to land and recharge.

One can mount the tethered drone and its base station on the back of a pickup truck to allow the pickup truck to pursue any target that is one the move. Yet, this solution places severe limitations on the most functional benefits of drones: the ability to fly in places where vehicles cannot travel, such as off-road, rough, or inaccessible terrain, hostile environments, etc.

Another solution involves the use of many tethered drone systems placed within range of one another so that a surveillance of a moving target can be "passed" from one system to another. While this is operationally functional, it requires many tethered drone systems surveilling a moving target within the zones covered by the laterally stationary "network" of tethered drone systems.

In the case of an untethered "drone-in-a-box," to maintain a continuous eye in the sky, multiple (redundant) systems are needed to be sure that one drone is flying and surveilling while the other systems are recharging.

SUMMARY

To overcome the foregoing challenges, this disclosure details a system including a unique quick release mechanism (QRM) that can be affixed to any suitable location of a UAV (e.g., a side or an underside thereof) to selectively and instantaneously detach the UAV from its tether assembly to transform the UAV from a tethered UAV into an untethered or free-flying UAV. Briefly, the disclosed system includes a data/power plug, a hook (e.g., a hook assembly) for securing a tether assembly to the UAV, and a drag device (e.g., a parachute, winged assembly, or mini drone) attached to the tether assembly to control descent of the tether assembly after the tether assembly is released from the UAV. The QRM includes a motor (e.g., a linear servo) controlled by, for instance, onboard electronics to release a slider plate that secures the data plug, hook, and drag device to the UAV. Indeed, actuation of the motor causes the slider plate to move in a direction to release the hook and the data plug from the UAV under the weight of the tether assembly. Movement of the slider plate also releases a spring-loaded door to enable the drag device affixed to the tether assembly to deploy and slow or control the descent of the tether assembly, the data plug, and the hook as the tether assembly line respools in a base station of the system.

The tether assembly release can be triggered automatically by the system based on visible, audible, etc. identification of predefined criteria from surveillance data (e.g., video/audio/pictorial data indicative of such targets as a red car, a person climbing a fence, etc.). Or the tether assembly release can be triggered manually by an operator. Once released, the untethered UAV can freely pursue a target. After a mission is complete, the UAV can autonomously return to the base station where the tether assembly, the drag device, and the data plug can be automatically and/or manually reattached.

In accordance with an aspect, this disclosure is directed to an unmanned aerial system. The unmanned aerial vehicle system includes a ground station, a tether assembly coupled to the ground station, and an unmanned aerial vehicle. The unmanned aerial vehicle having a quick release mechanism selectively coupled to the tether assembly to restrain movement of the unmanned aerial vehicle. The quick release mechanism is electrically actuatable to decouple the tether assembly from the unmanned aerial vehicle for enabling the unmanned aerial vehicle to fly freely.

In aspects of this disclosure, the tether assembly may include an attachment segment for securing the tether assembly to the quick release mechanism of the unmanned aerial vehicle and an electrical segment for electrically coupling the ground station to the unmanned aerial vehicle. The unmanned aerial vehicle system may further comprise an electrical plug to which the electrical segment is connected. The unmanned aerial vehicle system may further comprise a hook assembly to which the attachment segment is secured. The unmanned aerial vehicle system may further comprise a drag device that is secured to the hook assembly.

In aspects of this disclosure, the quick release mechanism may include a housing that supports a slider plate and a motor assembly. The motor assembly may be actuatable to move the slider plate relative to the housing between a first position and a second position. In the first position, the slider plate may be coupled to the hook assembly and the electrical plug, and in the second position, the slider plate may be decoupled from the hook assembly and the electrical plug. The slider plate may include a first finger that is selectively engageable with the hook assembly. The slider plate may include a second finger that is selectively engageable with a release door of the housing to maintain the release door in a closed position. The release door may be spring-loaded and positioned to move to an open position when the slider plate moves to the second position.

According to yet another aspect of this disclosure, an unmanned aerial vehicle includes a housing, a slider plate supported by the housing, and a motor assembly coupled to the slider plate. The motor assembly is actuatable to move the slider plate relative to the housing to selectively decouple a tether assembly from the housing to enable the unmanned aerial vehicle to fly freely.

In aspects of this disclosure, the unmanned aerial vehicle may further comprise a slider housing coupled to the slider plate. The slider housing may be coupled to the housing by a spring. The motor assembly may include an actuator that is engaged with the slider housing. The motor assembly may be actuatable to move the actuator relative to the motor assembly to slide the slider housing relative to the housing. The slider plate may include a plug recess configured to selectively engage an electrical plug. The slider plate may include a release portion for receiving the electrical plug and a retaining portion for securing the electrical plug to the slider plate.

In aspects of this disclosure, the unmanned aerial vehicle may further comprise a drag device such as a parachute supported in the housing by a release door. The drag device may be coupled to the tether assembly and the tether assembly may be coupled to the electrical plug. The slider plate may include at least one finger that is selectively engageable with a tab on the release door to maintain the release door in a closed position.

In aspects of this disclosure, the unmanned aerial vehicle may further comprise a controller that is disposed in electrical communication with the motor assembly. The controller may be configured to actuate the motor assembly.

According to one aspect of this disclosure, an unmanned aerial vehicle system includes an unmanned aerial vehicle, a tether assembly selectively coupled to the unmanned aerial vehicle, a processor, and a memory, containing instructions thereon, which, when executed by the processor, cause the system to disconnect the tether assembly from the unmanned aerial vehicle while the unmanned aerial vehicle is in flight.

Other aspects, features, and advantages will be apparent from the description, the drawings, and the claims that follow.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying figures of which.

Further details and aspects of exemplary embodiments of the disclosure are described in more detail below with reference to the appended figures. Any of the above aspects and embodiments of the disclosure may be combined without departing from the scope of the disclosure.

DETAILED DESCRIPTION

Although illustrative systems of this disclosure will be described in terms of specific aspects, it will be readily apparent to those skilled in this art that various modifications, rearrangements, and substitutions may be made without departing from the spirit of this disclosure.

For purposes of promoting an understanding of the principles of this disclosure, reference will now be made to exemplary aspects illustrated in the figures, and specific language will be used to describe the same. It will nevertheless be understood that no limitation of the scope of this disclosure is thereby intended. Any alterations and further modifications of this disclosure features illustrated herein, and any additional applications of the principles of this disclosure as illustrated herein, which would occur to one skilled in the relevant art and having possession of this disclosure, are to be considered within the scope of this disclosure.

In the following description, well-known functions or constructions are not described in detail to avoid obscuring the present disclosure in unnecessary detail.

Figure 1:
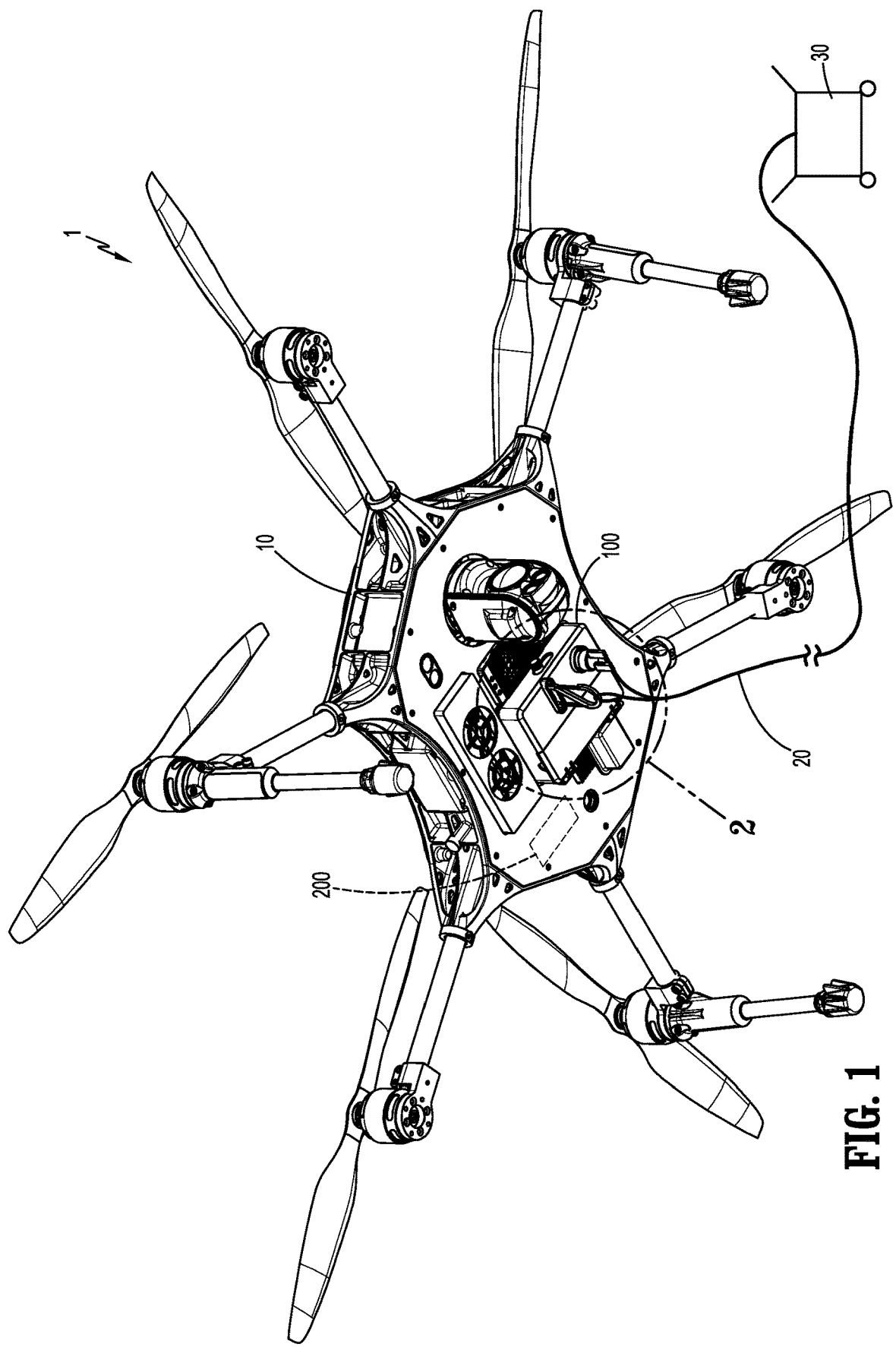
FIG. 1 is a perspective view of a UAV system including a UAV having a QRM shown attached thereto, the QRM shown secured to a tether assembly of a ground station in accordance with the principles of this disclosure.
Figure 2:
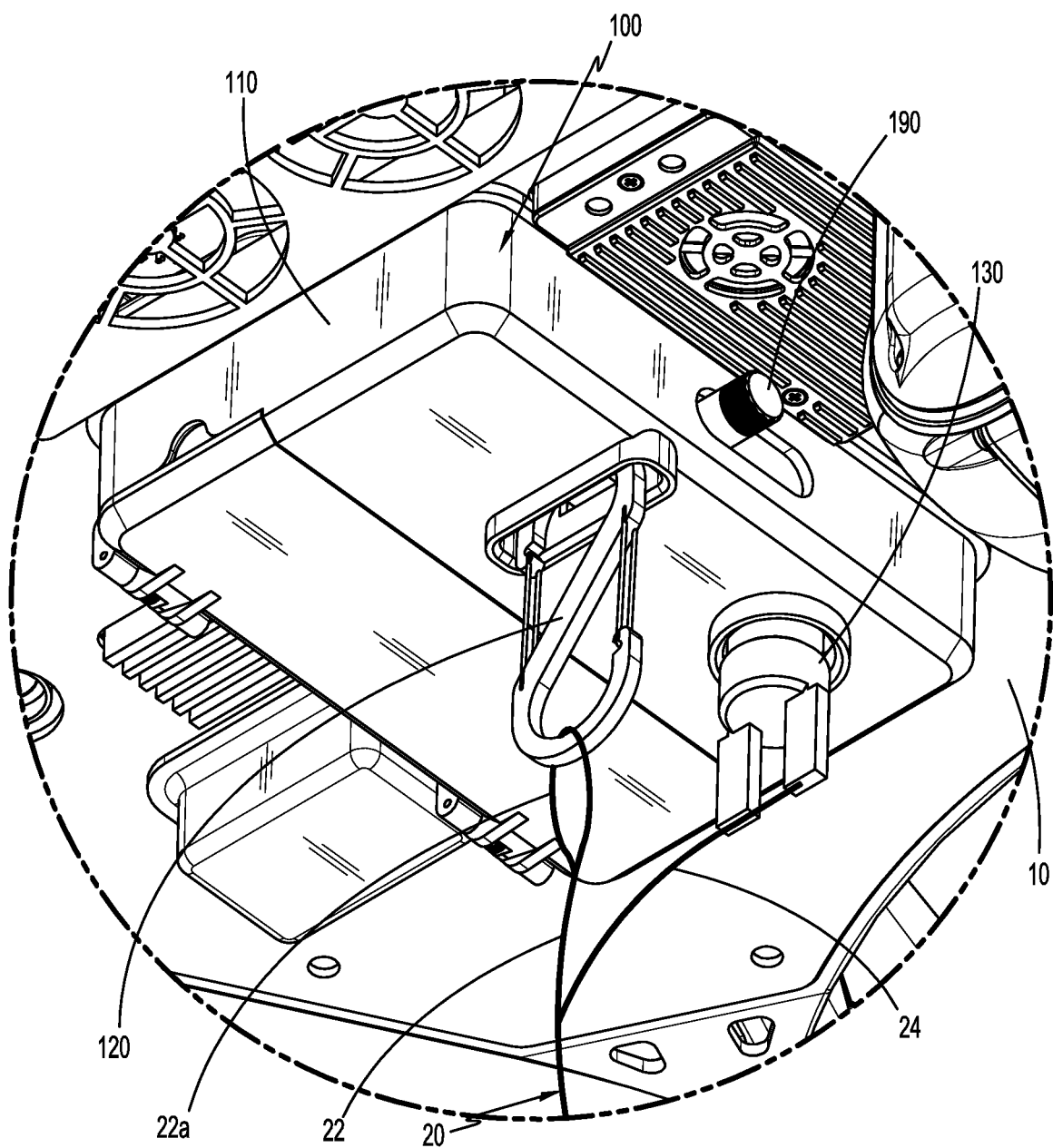
FIG. 2 is an enlarged, perspective view of the indicated area of detail shown in FIG. 1.
Figure 3:
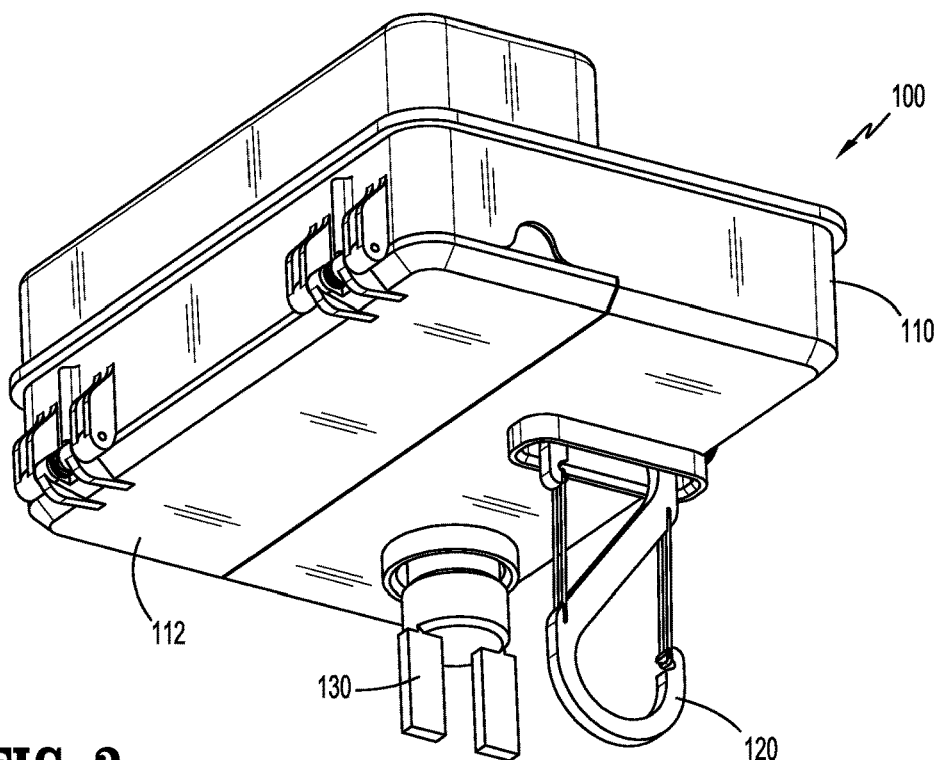
FIG. 3 is an enlarged, bottom perspective view of the QRM of FIG. 1.
Figure 4:
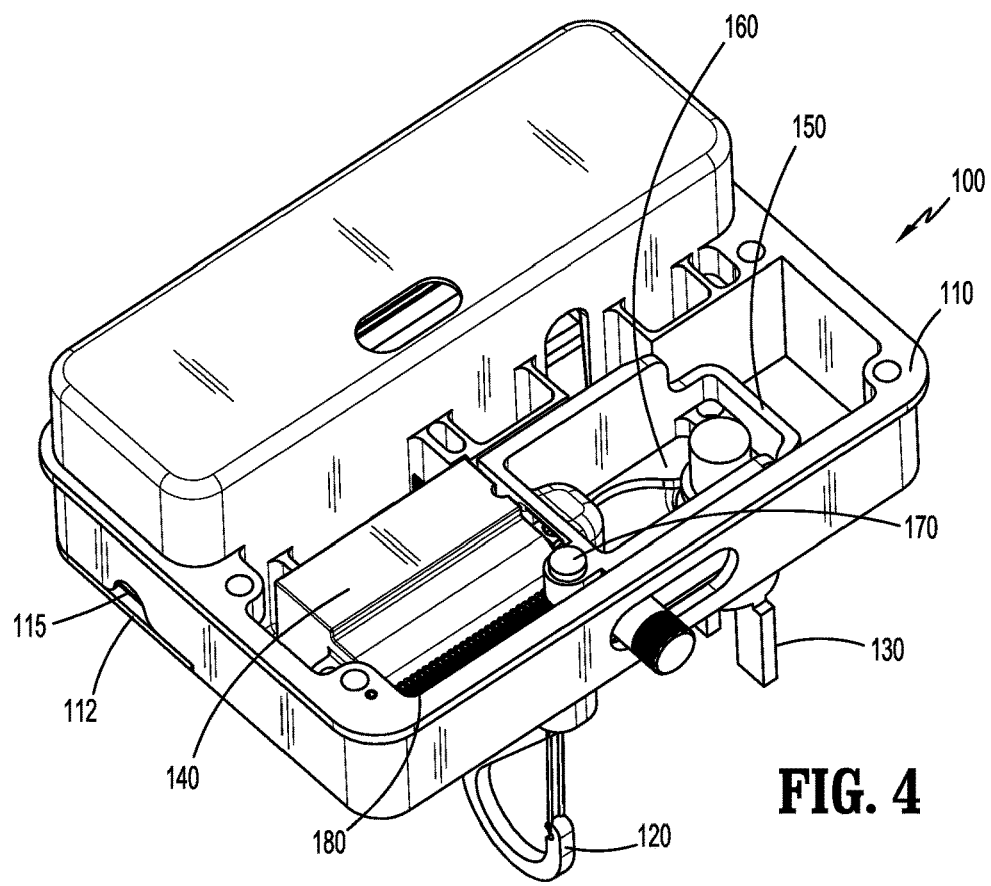
FIG. 4 is a top perspective view of FIG. 3.
Figure 5:
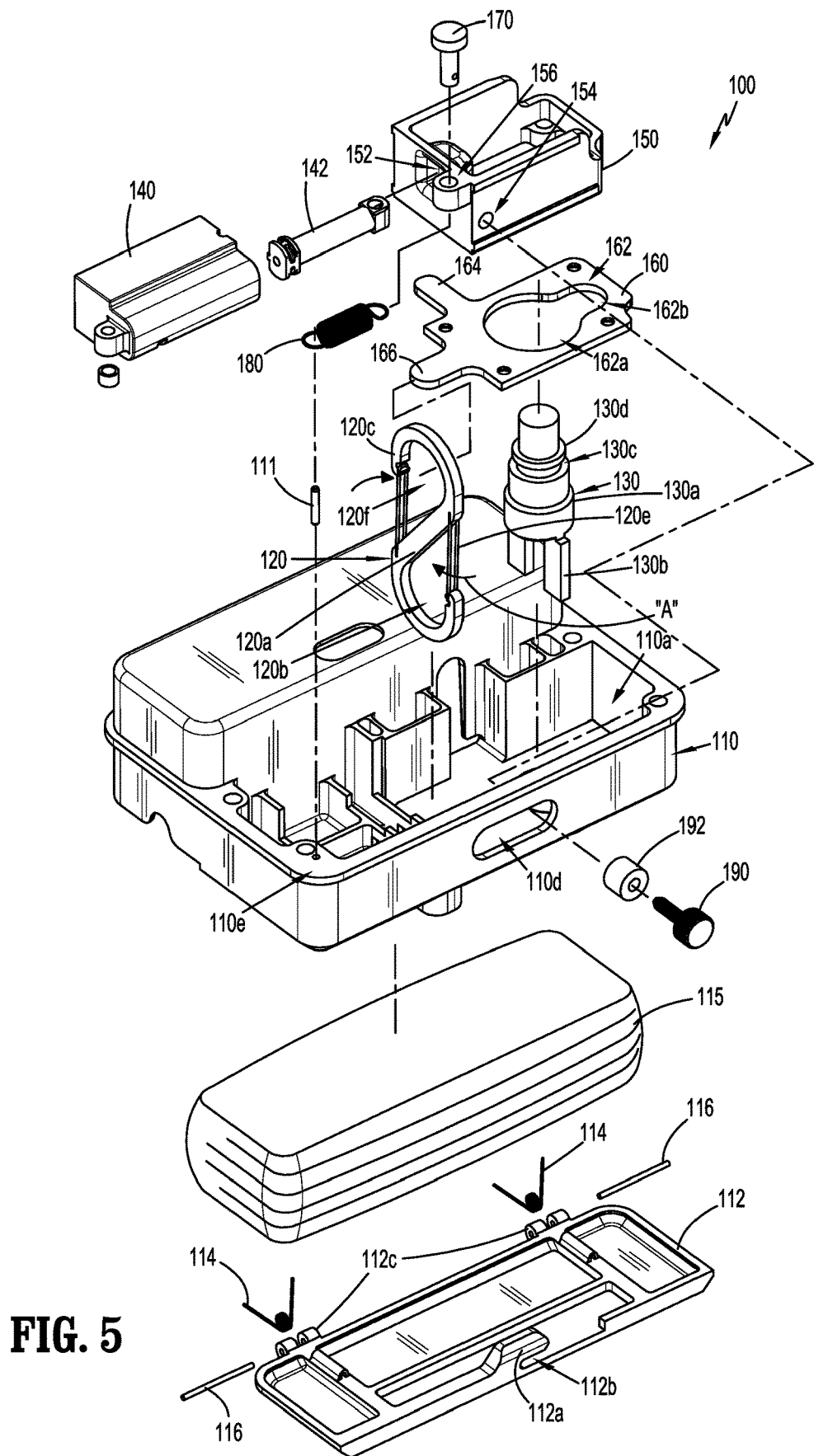
FIG. 5 is a perspective view, with parts separated, of the QRM of FIG. 3.
Figure 6:
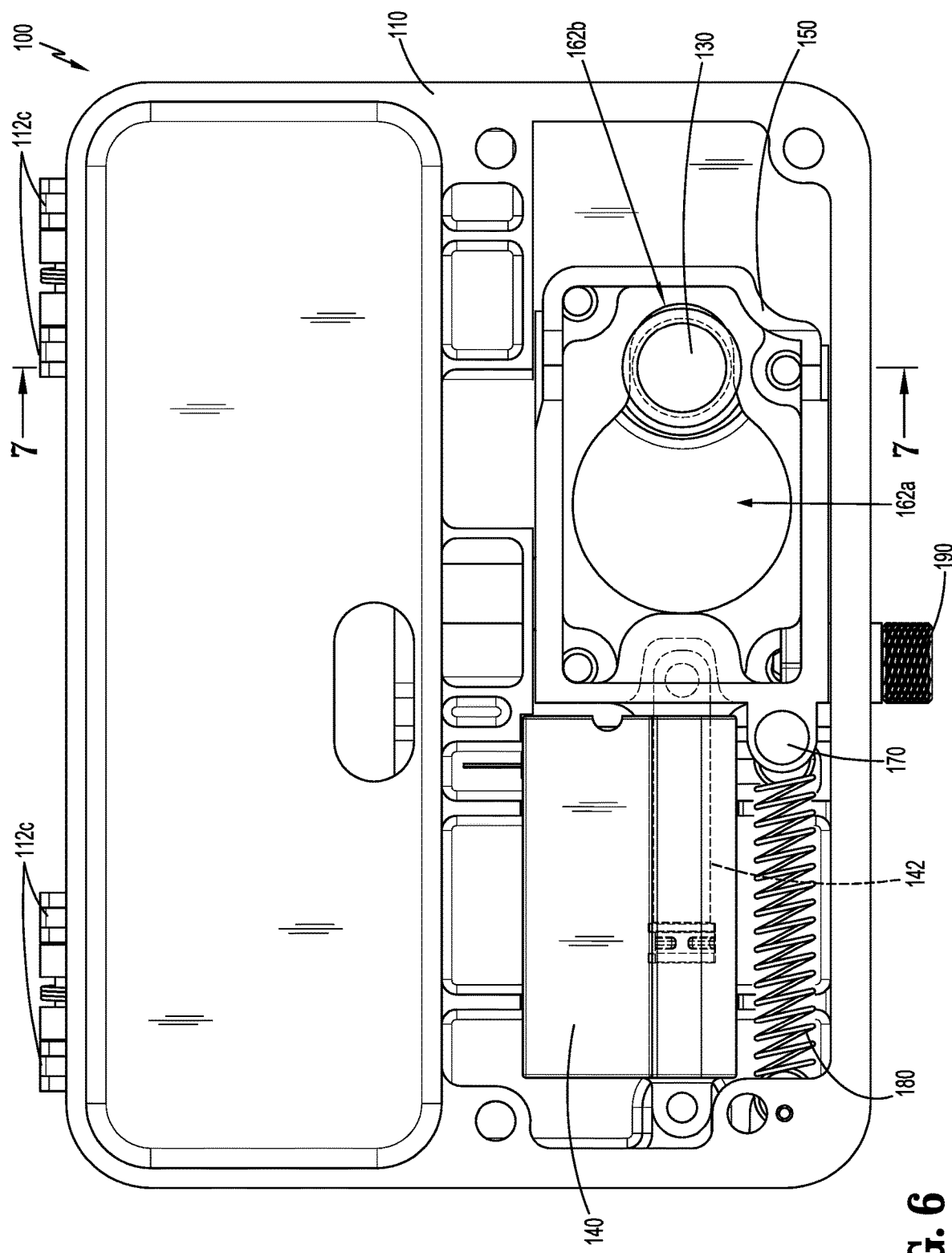
FIG. 6 is an enlarged, top view of the QRM of FIG. 3 with a slider plate thereof shown in a first position.
Figure 7:
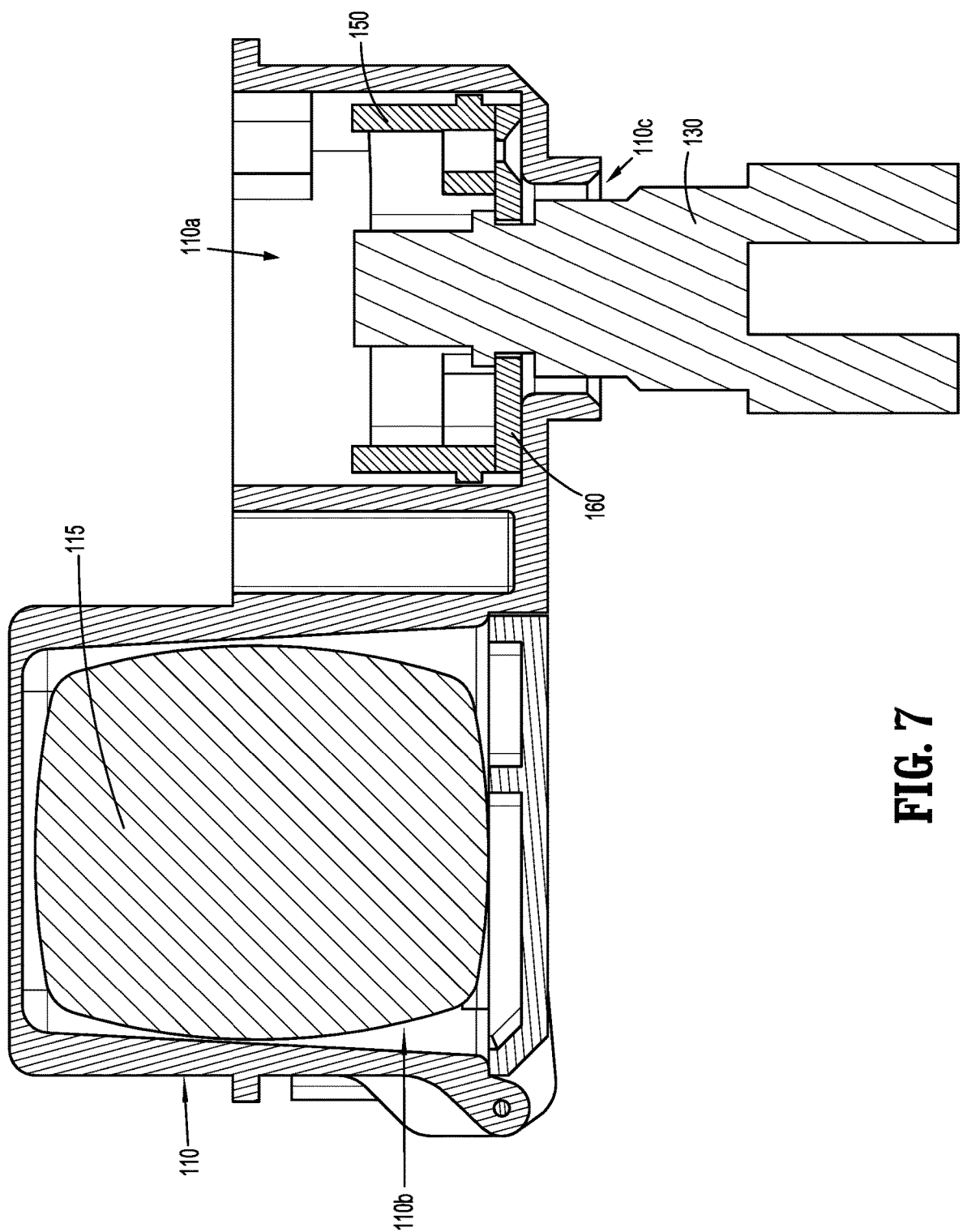
FIG. 7 is a side, cross-sectional view of the QRM of FIG. 3 as taken along section line 7-7 shown in FIG. 6.
Figure 8:
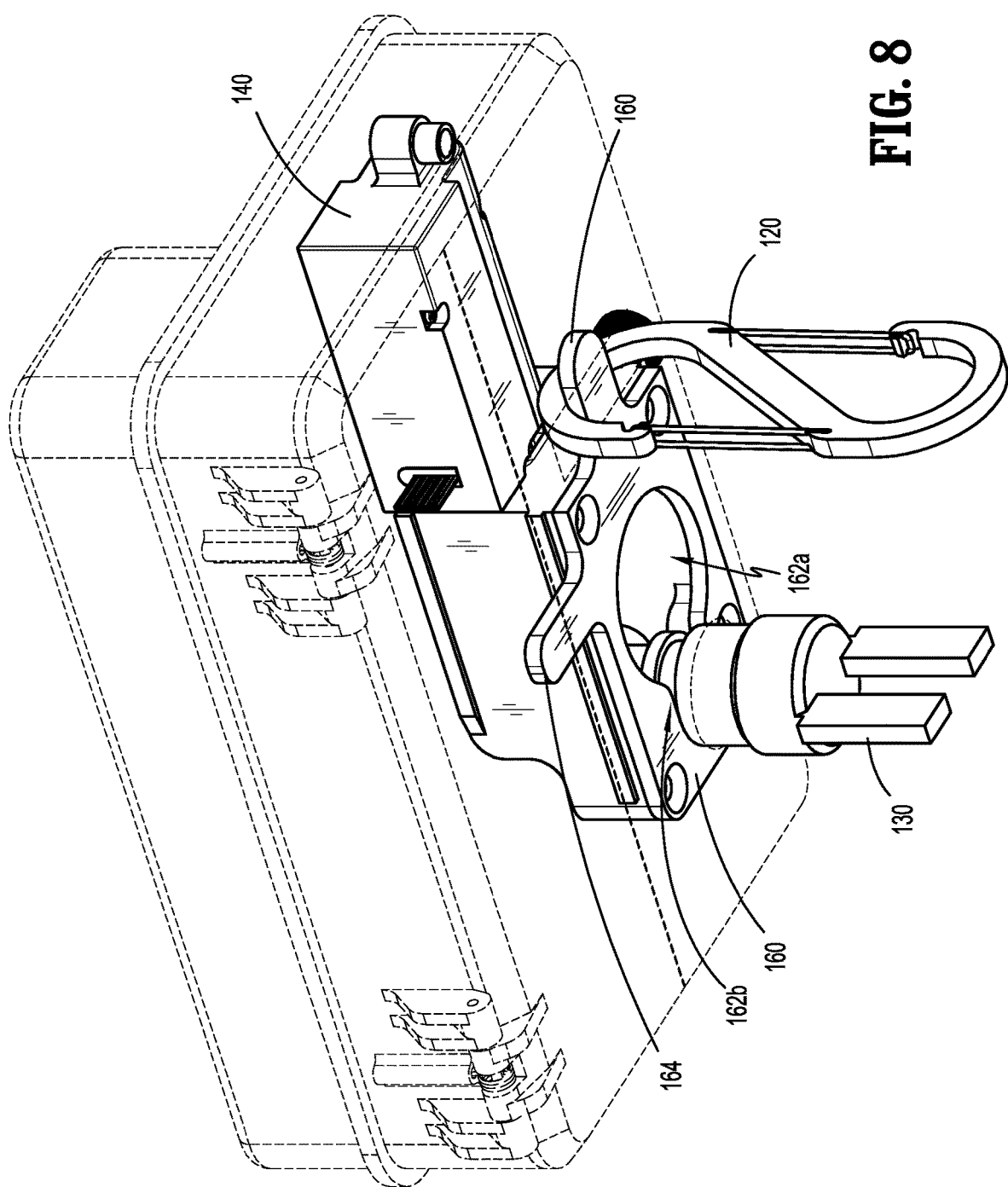
FIG. 8 is an enlarged, perspective view of the QRM of FIG. 3 with portions thereof shown in phantom for clarity.
Figure 9:
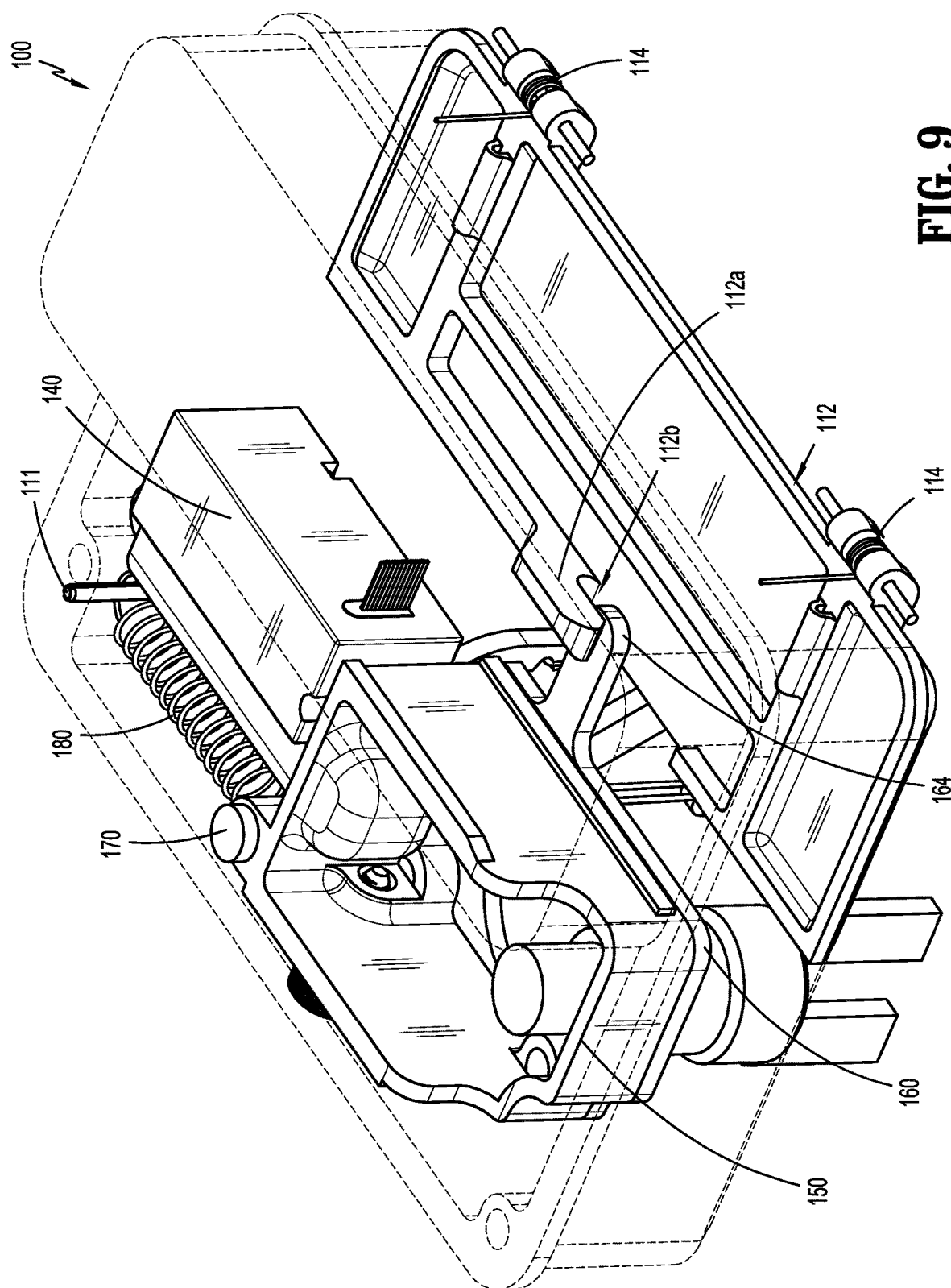
FIGS. 9-15 are progressive views illustrating the QRM being actuated to separate the tether assembly from the UAV.
Figure 10:
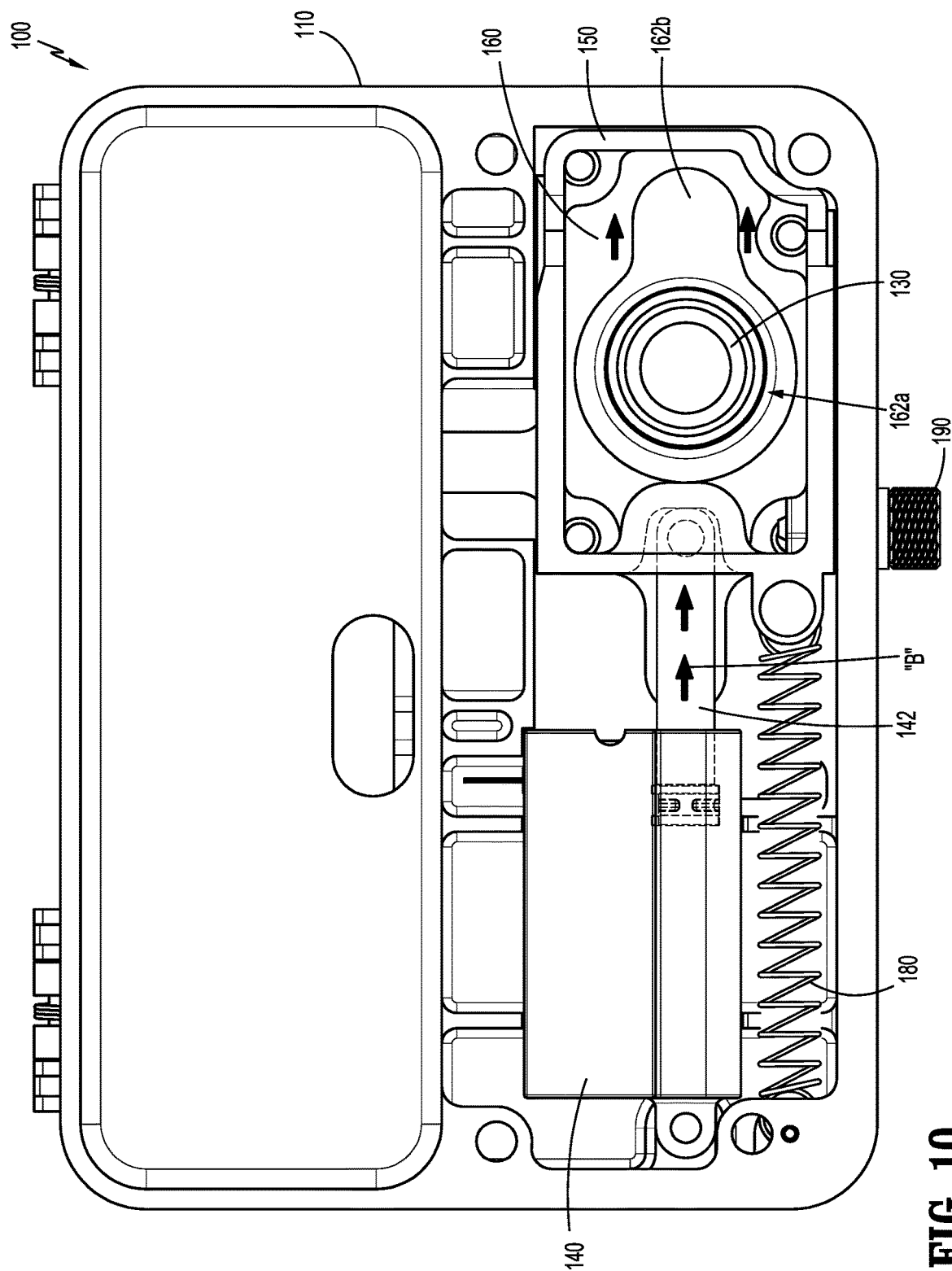
Figure 11:
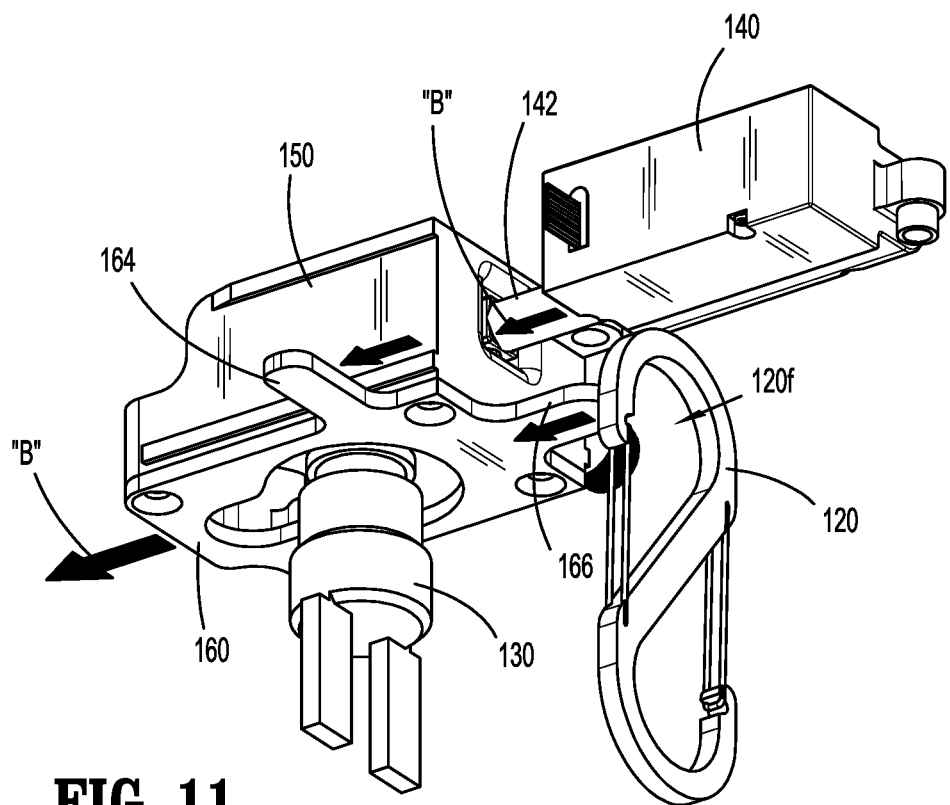
Figure 12:
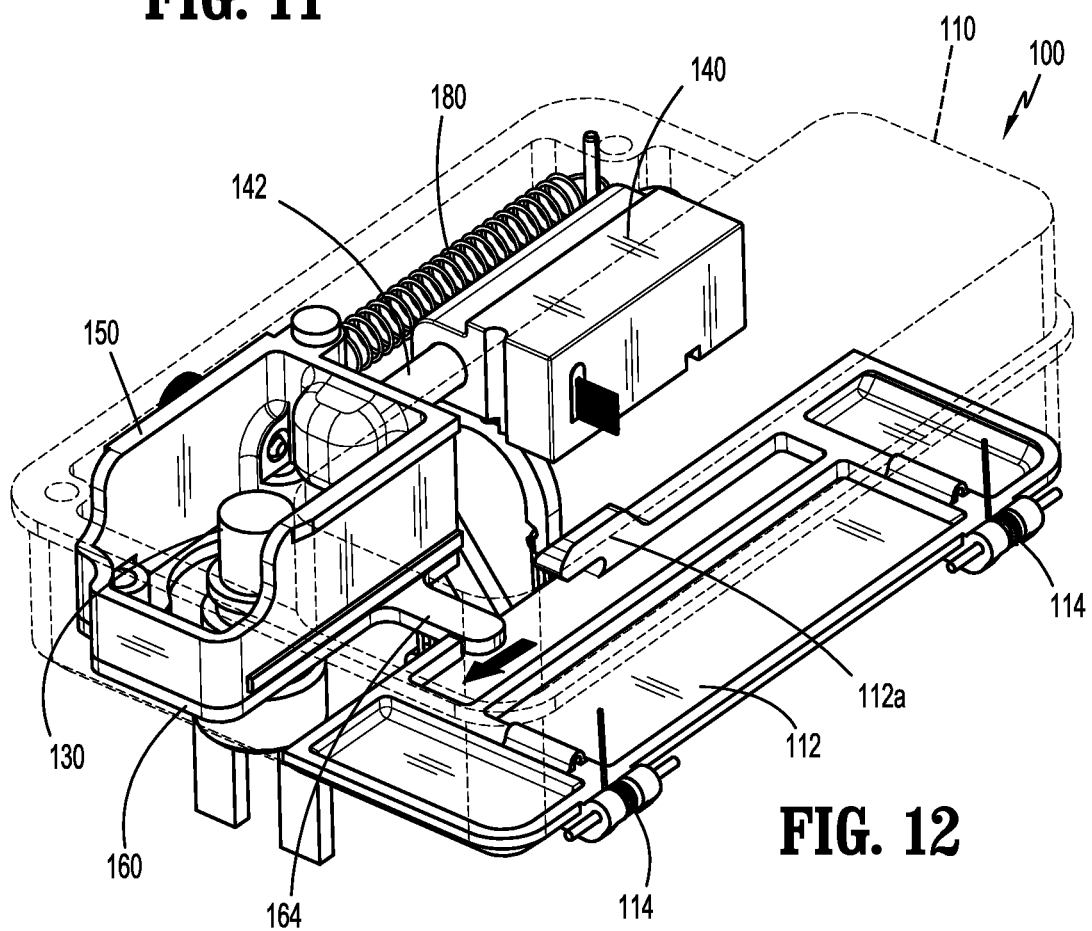
Figure 13:
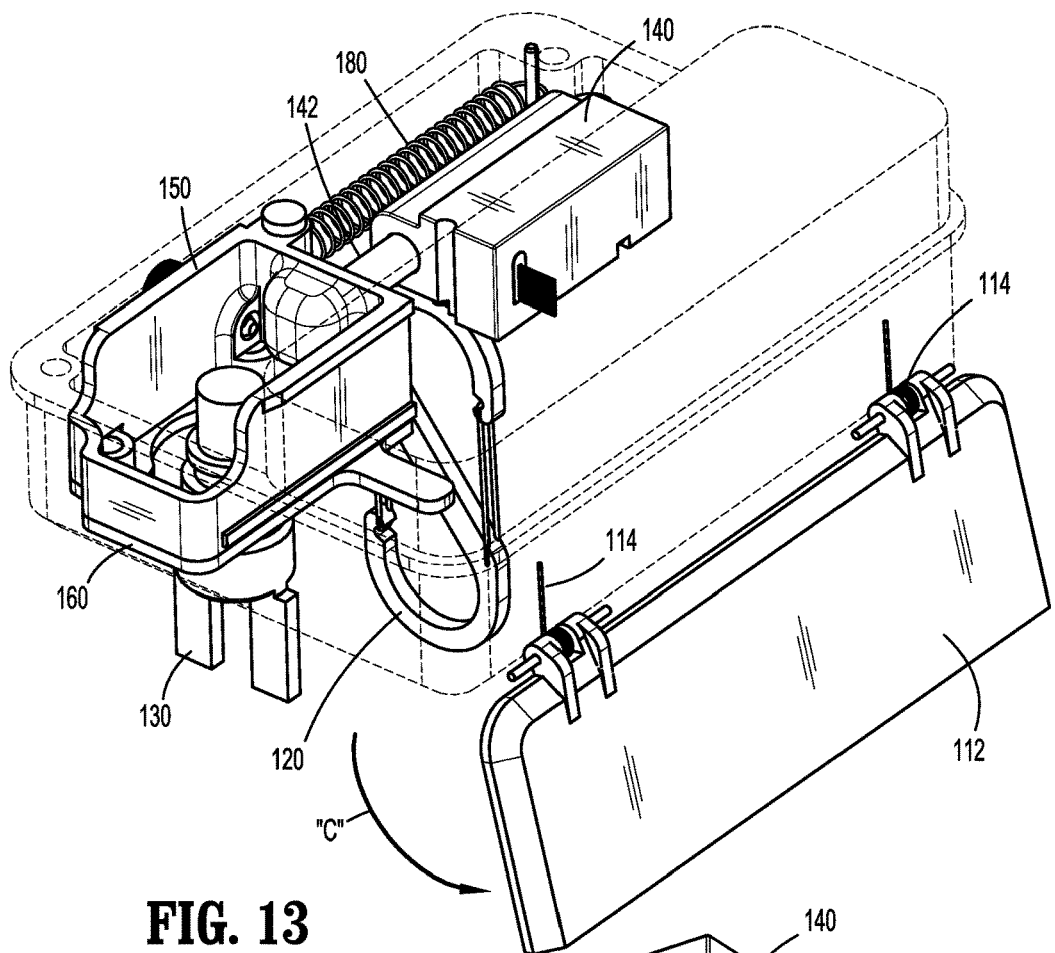
Figure 14:
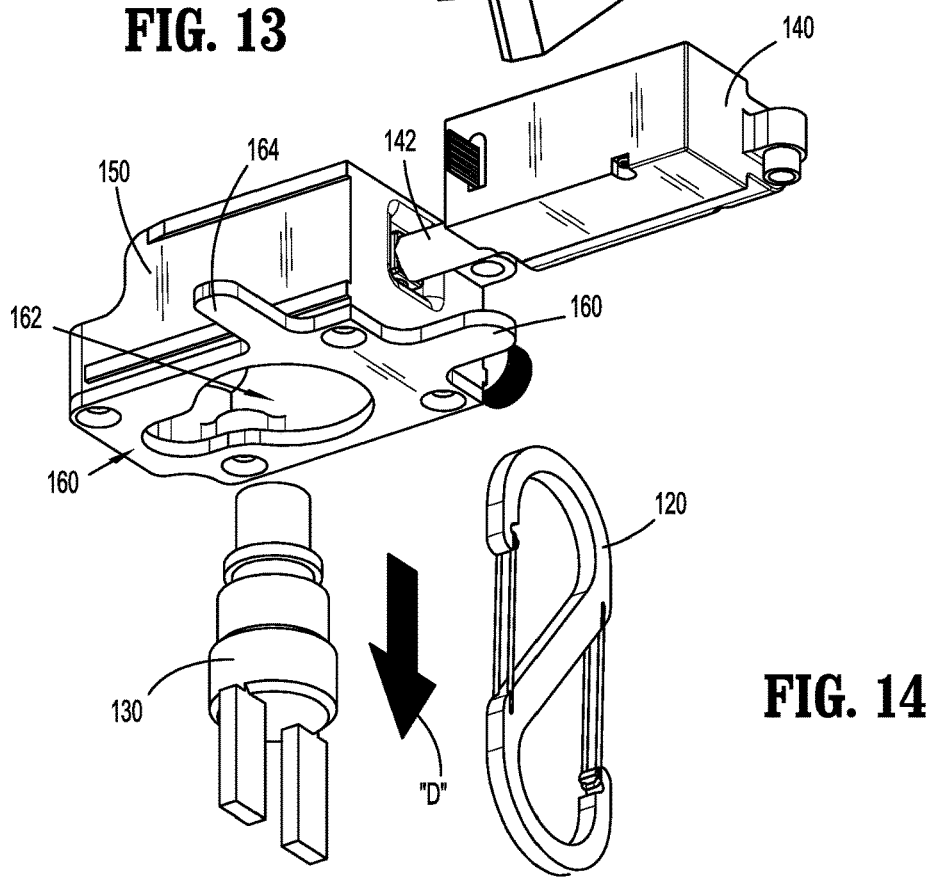
Figure 15:
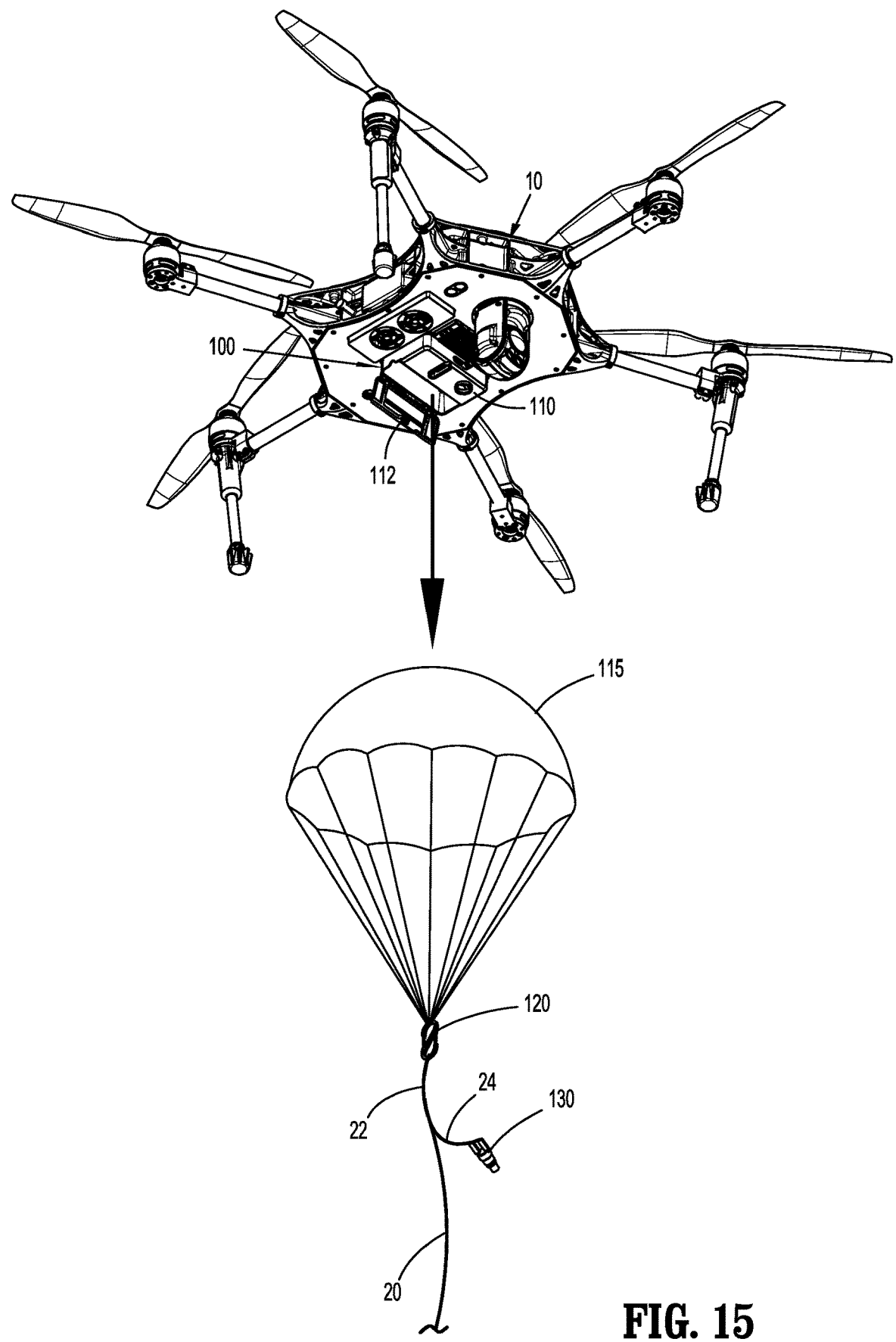

FIG. 1 illustrates an unmanned aerial vehicle (UAV) system 1 including a UAV 10, a tether assembly 20 of a ground station 30, a quick release mechanism (QRM) 100 that facilitates a releasable attachment of a first end of tether assembly 20 to UAV 10, and a computing device or controller 200 that facilitates operation and is disposed in electrical communication with the various components of UAV system 1. The ground station 30 supports a second end of the tether assembly 20 for stabilizing a position of the UAV 10 relative to the ground station 30 and for communicating with, and/or delivering power to, UAV 10. Ground station 30 and/or UAV 10 can include one or more controllers 200 configured to electrically communicate with one another.

Briefly, UAV 10 generally includes a plurality of components for operating UAV 10 such as a computing system, a propulsion system, a rechargeable battery, a positioning system, a video system, a wireless communication transceiver, etc. (some of which are not explicitly shown). Components such as the wireless transceiver and/or computing systems can be configured to communicate video, geolocation from the positioning system, and any relevant status of the UAV, or components thereof, such as battery status of the UAV, to the ground station or other monitoring stations in accordance with any suitable techniques known to persons of ordinary skill in the art.

For a more detailed description of such UAVs and/or ground stations, one or more components of which can be incorporated into, or modified for use with the components of this disclosure, reference can be made, for example, to U.S. Pat. No. 9,811,083, issued Nov. 7, 2017, and U.S. patent application Ser. No. 16/937,937, filed Jul. 24, 2020, the entire contents of each of which are incorporated by reference herein.

Referring to FIGS. 2-9, QRM 100 of UAV system 1 generally includes a housing 110, a drag device such as a parachute 115, a hook assembly 120 (e.g., a carabiner), an electrical plug 130 (e.g., an Amphenol), a motor assembly 140 (e.g., a linear servo motor), a slider housing 150, a slider plate 160, a pin 170, a spring 180, and a reset knob 190. Tether assembly 20 of UAV system 1 includes an attachment segment 22 and an electrical segment 24 that split from one another at one end of tether assembly 20, the other end of tether assembly 20 being secured to ground station 30. Attachment segment 22 extends to a distal snare 22a for securing tether assembly 20 to hook assembly 120 of QRM 100. Electrical segment 24 is electrically coupled to electrical plug 130 for transmitting data and power between UAV 10 and ground station 30 of UAV system 1.

Housing 110 defines a slider channel 110a for slidably supporting slider housing 150 and slider plate 160 therein. Housing 110 further defines a drag device cavity 110b for removably supporting a drag device (e.g., a parachute) 115 therein and a plug cavity 110c for removably supporting power and data plug 130 therein. Housing 110 also defines an elongate channel 110c in a side surface thereof for slidably supporting reset knob 160 therein and a spring pin channel 110e for supporting a spring pin 111 therein. Motor assembly 140 is also supported by housing 110 and includes an actuator 142 that is movable (e.g., axially translatable) relative to motor assembly 140 to move slider housing 150 and slider plate 160 through slider channel 110a relative to housing 110.

Housing 110 supports a release door 112 that is spring-loaded by springs 114 and pivotally coupled to an underside of housing 110 via pins 116. Release door 12 includes a slider tab 112a that overhangs a finger channel 112b defined in release door 12 and which is selectively positioned to engage slider plate 160. Release door 112 also includes a plurality of eyelets 112c extending therefrom. Housing 110 also includes a plurality of eyelets 112c that interlock with eyelets 112c extending from release door 112 (see FIG. 6) so that eyelets 112c receive pins 116 therethrough for pivotably coupling release door 112 to housing 110.

Hook assembly 120 has an S-shaped body 120a having a lower hook 120b for coupling to tether assembly 20 and an upper hook 120c for selectively coupling to slider plate 160. Hook assembly 120 further includes a pivotable gates 120e that selectively enable lateral access to hook openings 120f defined through hook assembly 120 when pivoted open as indicated by arrow "A."

Electrical plug 130 includes a body 130a having data and power connectors 130b for electrically coupling to electrical segment 24 of tether assembly 20. Electrical plug 130 further defines a retainer recess 130c and includes a retaining lip 130d adjacent retainer recess 130c for facilitating securement of electrical plug 130 to slider plate 160.

Slider housing 150 defines an actuator recess 152 for receiving actuator 142, a knob recess 154 for receiving reset knob 190. Slider housing 150 also defines a pin recess 156 for receiving pin 170 therethrough for coupling one end of spring 180 to slider housing 150 via pin 170. The other end of spring 180 is coupled to housing 110 via pin 111 to bias or urge slider toward pin 111 when slider housing 150 moves away from pin 111.

Slider plate 160 is secured to a bottom surface of slider housing 150 (e.g., via fasteners or may be integrally formed with slider housing 150). Slider plate 160 defines plug recess 162 therethrough for receiving electrical plug 130 therein. Plug recess 162 includes a release portion 162a and a retaining portion 162b that is smaller than the release portion 162a for securing electrical plug 130 to slider plate 160 via retaining lip 130d and retainer recess 130c of electrical plug 130. Slider plate 160 further includes a first finger 164 extending therefrom that is selectively engageable with slider tab 112a and slidable along finger channel 112b of release door 12 to selectively secure release door 112 in a closed position (see FIG. 9). Slider plate 160 also includes a second finger 166 extending therefrom that is receivable in an upper hook opening 120f of hook assembly 120 to secure hook assembly 120 to slider plate 160 via upper hook 120c.

With reference to FIGS. 10-15, to enable UAV 10 to separate from tether assembly 20, motor assembly 140 drives actuator 142 linearly away from motor assembly 20, as indicated by arrows "B," so that slider housing 150 and slider plate 160 slide through slider channel 110a against the bias of spring 180. In aspects, motor assembly 140 may be configured for unidirectional driving. As spring 180 elongates, slider housing 150 and slider plate 160 move relative to electrical plug 130 and hook assembly 120. As slider plate 160 moves away from motor assembly 140, first finger 164 slides away from slider tab 112a, releasing release door 112 so that springs 114 cause release door 112 to open, as indicated by arrow "C" for releasing drag device (e.g., parachute) 115 therefrom. Simultaneously, second finger 166 slides out of upper hook opening 120f so that hook assembly 120 can separate from QRM 100 and fall freely therefrom, as indicated by arrow "D." Also, simultaneously, movement of slider plate 160 positions electrical plug 130 in release portion 162a of plug recess 160 so that electrical plug 130 can separate from slider plate 160 and fall freely, also indicated by arrow "D." With drag device 115 secured to hook assembly 120, drag device 115 falls from QRM 100 and positions itself for inducing drag (e.g., extends outwardly such as in the case of a winged device, opens up such as in the case of a chute, and/or turns on such as in the case of a mini drone), slowing and/or otherwise controlling the decent of tether assembly 20, electrical plug 130, and hook assembly 120 back toward ground station 30.

Once drag device 115, hook assembly 120, and electrical plug 130 are separated from UAV 10, UAV 10 is free to fly anywhere as desired and slider housing 150 and slider plate 160 retract to initial or default positions thereof under the biasing forces of spring 180. UAV 10 can return to ground station 30, for example, when a free flying mission is complete or a repair, or recharging, etc. are necessary. UAV 10 can then be reattached to UAV 10 via QRM 100 by positioning drag device 115 into housing 110 and resecuring hook assembly 120 and electrical plug 130 to slider plate 160.

To facilitate reattachment of tether assembly 20, electrical plug 130, hook assembly 120, drag device 115, etc., slider housing 150 and slider plate 160 can be slid manually via reset knob 190, even when UAV 10 is off and unpowered, to an unlocked position so that electrical plug 130 and hook assembly 120 can be reinserted. The release door 112 can then be closed with drag device 115 therein so that reset knob 190 can be released, whereby elongated spring 180 retracts slider housing 150, actuator 142, and slider plate 160 back to their initial or default positions for locking hook assembly 120, electrical plug 130, drag device 115, and release door 112, etc. in place. UAV 10 can then again be utilized as a tethered UAV 10 that is selectively separable from tether assembly 20, electrical plug 130, hook assembly 120, and drag device 115 as detailed above.

Figure 16:
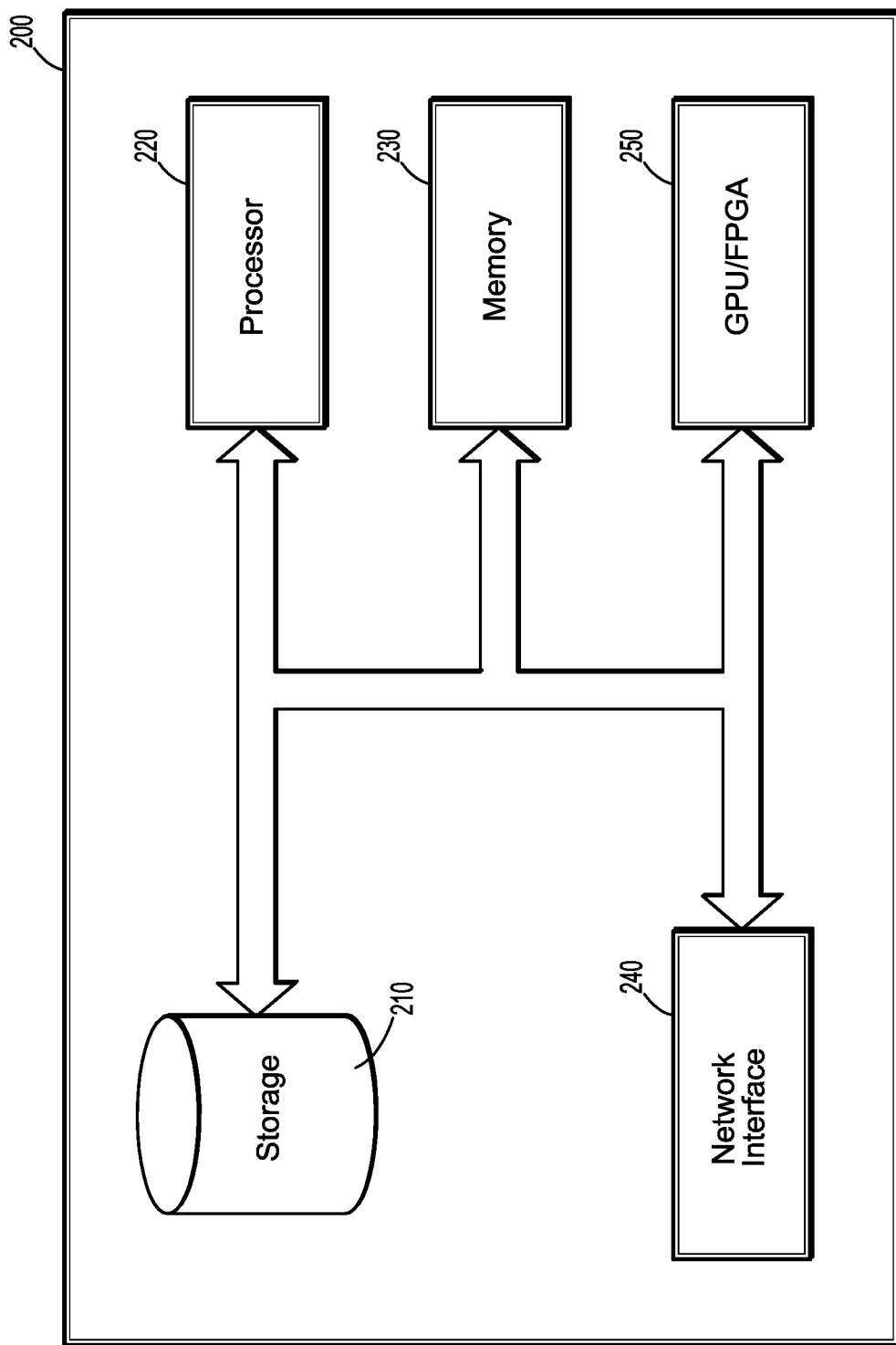
FIG. 16 is a block diagram of a controller of the UAV system of FIG. 1.

With reference to FIG. 16, and as noted above, controller 200 can be utilized to effectuate operation of UAV system 1 and/or components thereof, for instance, the separation of UAV 10 from tether assembly 20, electrical plug 130, hook assembly 120, and drag device 115. Notably, the controller 200 can include a processor 220 connected to a computer-readable storage medium or a memory 230. The computer-readable storage medium or memory 230 may be a volatile type memory, e.g., RAM, or a non-volatile type memory, e.g., flash media, disk media, etc. In various aspects of the disclosure, the processor 220 may be another type of processor such as, without limitation, a digital signal processor, a microprocessor, an ASIC, a graphics processing unit (GPU), a field-programmable gate array (FPGA), or a central processing unit (CPU). In certain aspects of the disclosure, network inference may also be accomplished in systems that have weights implemented as memristors, chemically, or other inference calculations, as opposed to processors.

In aspects of the disclosure, the memory 230 can be random access memory, read-only memory, magnetic disk memory, solid-state memory, optical disc memory, and/or another type of memory. In some aspects of the disclosure, the memory 230 can be separate from the controller 200 and can communicate with the processor 220 through communication buses of a circuit board and/or through communication cables such as serial ATA cables or other types of cables. The memory 230 includes computer-readable instructions that are executable by the processor 220 to operate the controller 200. In other aspects of the disclosure, the controller 200 may include a network interface 240 to communicate with other computers or to a server. A storage device 210 may be used for storing data.

The disclosed method may run on the controller 200 or on a user device, including, for example, on a mobile device, an IoT device, or a server system.

The controller 200 is configured to receive among other data, the UAV battery status and UAV location, and control, among other features, the baseplate's position, and deployment of the UAVs. The controller 200 may be further configured to control the operation of the storage and deployment of the UAVs.

The disclosed structure can include any suitable mechanical, electrical, and/or chemical components for operating the disclosed system or components thereof. For instance, such electrical components can include, for example, any suitable electrical and/or electromechanical, and/or electrochemical circuitry, which may include or be coupled to one or more printed circuit boards. As appreciated, the disclosed computing devices (and/or servers) can include, for example, a "controller," "processor," "digital processing device" and like terms, and which are used to indicate a microprocessor or central processing unit (CPU). The CPU is the electronic circuitry within a computer that carries out the instructions of a computer program by performing the basic arithmetic, logical, control and input/output (I/O) operations specified by the instructions, and by way of non-limiting examples, include server computers. In some aspects, the controller includes an operating system configured to perform executable instructions. The operating system is, for example, software, including programs and data, which manages hardware of the disclosed apparatus and provides services for execution of applications for use with the disclosed apparatus. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. In some aspects, the operating system is provided by cloud computing.

In some aspects, the term "controller" may be used to indicate a device that controls the transfer of data from a computer or computing device to a peripheral or separate device and vice versa, and/or a mechanical and/or electromechanical device (e.g., a lever, knob, etc.) that mechanically operates and/or actuates a peripheral or separate device.

In aspects, the controller includes a storage and/or memory device. The storage and/or memory device is one or more physical apparatus used to store data or programs on a temporary or permanent basis. In some aspects, the controller includes volatile memory and requires power to maintain stored information. In various aspects, the controller includes non-volatile memory and retains stored information when it is not powered. In some aspects, the non-volatile memory includes flash memory. In certain aspects, the non-volatile memory includes dynamic random-access memory (DRAM). In some aspects, the non-volatile memory includes ferroelectric random-access memory (FRAM). In various aspects, the non-volatile memory includes phase-change random access memory (PRAM). In certain aspects, the controller is a storage device including, by way of non-limiting examples, CD-ROMs, DVDs, flash memory devices, magnetic disk drives, magnetic tapes drives, optical disk drives, and cloud-computing-based storage. In various aspects, the storage and/or memory device is a combination of devices such as those disclosed herein.

In various embodiments, the memory can be random access memory, read-only memory, magnetic disk memory, solid state memory, optical disc memory, and/or another type of memory. In various embodiments, the memory can be separate from the controller and can communicate with the processor through communication buses of a circuit board and/or through communication cables such as serial ATA cables or other types of cables. The memory includes computer-readable instructions that are executable by the processor to operate the controller. In various embodiments, the controller may include a wireless network interface to communicate with other computers or a server. In embodiments, a storage device may be used for storing data. In various embodiments, the processor may be, for example, without limitation, a digital signal processor, a microprocessor, an ASIC, a graphics processing unit ("GPU"), field-programmable gate array ("FPGA"), or a central processing unit ("CPU").

The memory stores suitable instructions, to be executed by the processor, for receiving the sensed data (e.g., sensed data from GPS, camera, etc. sensors), accessing storage device of the controller, generating a raw image based on the sensed data, comparing the raw image to a calibration data set, identifying an object based on the raw image compared to the calibration data set, transmitting object data to a ground-based post-processing unit, and displaying the object data to a graphic user interface. Although illustrated as part of the disclosed structure, it is also contemplated that a controller may be remote from the disclosed structure (e.g., on a remote server), and accessible by the disclosed structure via a wired or wireless connection. In embodiments where the controller is remote, it is contemplated that the controller may be accessible by, and connected to, multiple structures and/or components of the disclosed system.

The term "application" may include a computer program designed to perform functions, tasks, or activities for the benefit of a user. Application may refer to, for example, software running locally or remotely, as a standalone program or in a web browser, or other software which would be understood by one skilled in the art to be an application. An application may run on the disclosed controllers or on a user device, including for example, on a mobile device, an IOT device, or a server system.

In some aspects, the controller includes a display to send visual information to a user. In various aspects, the display is a cathode ray tube (CRT). In various aspects, the display is a liquid crystal display (LCD). In certain aspects, the display is a thin film transistor liquid crystal display (TFT-LCD). In aspects, the display is an organic light emitting diode (OLED) display. In certain aspects, on OLED display is a passive-matrix OLED (PMOLED) or active-matrix OLED (AMOLED) display. In aspects, the display is a plasma display. In certain aspects, the display is a video projector. In various aspects, the display is interactive (e.g., having a touch screen or a sensor such as a camera, a 3D sensor, a LiDAR, a radar, etc.) that can detect user interactions/gestures/responses and the like. In some aspects, the display is a combination of devices such as those disclosed herein.

The controller may include or be coupled to a server and/or a network. As used herein, the term "server" includes "computer server," "central server," "main server," and like terms to indicate a computer or device on a network that manages the disclosed apparatus, components thereof, and/or resources thereof. As used herein, the term "network" can include any network technology including, for instance, a cellular data network, a wired network, a fiber-optic network, a satellite network, and/or an IEEE 802.11a/b/g/n/ac wireless network, among others.

In various aspects, the controller can be coupled to a mesh network. As used herein, a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

In some aspects, the controller may include one or more modules. As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task.

As used herein, the controller includes software modules for managing various aspects and functions of the disclosed system or components thereof.

The disclosed structure may also utilize one or more controllers to receive various information and transform the received information to generate an output. The controller may include any type of computing device, computational circuit, or any type of processor or processing circuit capable of executing a series of instructions that are stored in memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, cause the one or more processors to perform one or more methods and/or algorithms.

As can be appreciated, securement of any of the components of the disclosed systems can be effectuated using known securement techniques such welding, crimping, gluing, fastening, etc.

The phrases "in an aspect," "in aspects," "in various aspects," "in some aspects," or "in other aspects" may each refer to one or more of the same or different aspects in accordance with the present disclosure. Similarly, the phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the techniques).

Certain aspects of the present disclosure may include some, all, or none of the above advantages and/or one or more other advantages readily apparent to those skilled in the art from the drawings, descriptions, and claims included herein. Moreover, while specific advantages have been enumerated above, the various embodiments of the present disclosure may include all, some, or none of the enumerated advantages and/or other advantages not specifically enumerated above.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

Any of the herein described methods, programs, algorithms, or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to all such states. Reference to a program may encompass the actual instructions and/or the intent of those instructions.

Persons skilled in the art will understand that the structures and methods specifically described herein and illustrated in the accompanying figures are non-limiting exemplary aspects, and that the description, disclosure, and figures should be construed merely as exemplary of aspects. It is to be understood, therefore, that this disclosure is not limited to the precise aspects described, and that various other changes and modifications may be effectuated by one skilled in the art without departing from the scope or spirit of the disclosure. Additionally, it is envisioned that the elements and features illustrated or described in connection with one exemplary aspect may be combined with the elements and features of another without departing from the scope of this disclosure, and that such modifications and variations are also intended to be included within the scope of this disclosure. Indeed, any combination of any of the disclosed elements and features is within the scope of this disclosure. Accordingly, the subject matter of this disclosure is not to be limited by what has been particularly shown and described.

What is claimed is:

1. An unmanned aerial vehicle system, comprising:
   a tether assembly;
   an unmanned aerial vehicle comprising:
      a housing;
      a slider plate supported by the housing; and
      a motor assembly coupled to the slider plate;
   a processor; and
   a memory, containing instructions thereon, which, when executed by the processor, cause the unmanned aerial vehicle to:
      move the slider plate relative to the housing to selectively decouple the tether assembly from the housing.

2. The unmanned aerial vehicle system of claim 1, further comprising a slider housing coupled to the slider plate.

3. The unmanned aerial vehicle system of claim 2, wherein the slider housing is coupled to the housing by a spring.

4. The unmanned aerial vehicle system of claim 2, wherein the motor assembly includes an actuator that is engaged with the slider housing, the motor assembly actuatable to move the actuator relative to the motor assembly to slide the slider housing relative to the housing.

5. The unmanned aerial vehicle system of claim 2, wherein the slider plate includes a plug recess configured to selectively engage an electrical plug.

6. The unmanned aerial vehicle system of claim 5, wherein the slider plate includes a release portion for receiving the electrical plug and a retaining portion for securing the electrical plug to the slider plate.

7. The unmanned aerial vehicle system of claim 1, further comprising a drag device supported in the housing by a release door.

8. The unmanned aerial vehicle of claim 7, wherein the drag device is coupled to the tether assembly.

9. The unmanned aerial vehicle system of claim 1, further comprising a controller that is disposed in electrical communication with the motor assembly, the controller configured to actuate the motor assembly.

10. The unmanned aerial vehicle system of claim 7, wherein the slider plate includes at least one finger that is selectively engageable with a tab on the release door to maintain the release door in a closed position.

11. An unmanned aerial vehicle system, comprising:
    a tether assembly;
    an unmanned aerial vehicle comprising:
       a housing; and
       a slider plate supported by the housing;
    a processor; and
    a memory, containing instructions thereon, which, when executed by the processor, cause the unmanned aerial vehicle to:
       move the slider plate relative to the housing to selectively decouple the tether assembly from the housing.

12. The unmanned aerial vehicle system of claim 11, further comprising a slider housing coupled to the slider plate.

13. The unmanned aerial vehicle system of claim 12, wherein the slider housing is coupled to the housing by a spring.

14. The unmanned aerial vehicle system of claim 12, wherein the unmanned aerial vehicle further includes a motor assembly that is operable to move the slider housing relative to the housing.

15. The unmanned aerial vehicle system of claim 12, wherein the slider plate includes a plug recess configured to selectively engage an electrical plug.

16. The unmanned aerial vehicle system of claim 15, wherein the slider plate includes a release portion for receiving the electrical plug and a retaining portion for securing the electrical plug to the slider plate.

17. The unmanned aerial vehicle system of claim 11, further comprising a drag device supported in the housing by a release door.

18. The unmanned aerial vehicle of claim 17, wherein the drag device is coupled to the tether assembly.

19. The unmanned aerial vehicle system of claim 14, further comprising a controller that is disposed in electrical communication with the motor assembly to actuate the motor assembly.

20. The unmanned aerial vehicle system of claim 17, wherein the slider plate includes at least one finger that is selectively engageable with a tab on the release door to maintain the release door in a closed position.

* * * * *